(12) United States Patent
Sadeh

(10) Patent No.: US 12,361,501 B2
(45) Date of Patent: Jul. 15, 2025

(54) VERSATILE CROP YIELD ESTIMATOR

(71) Applicant: SATYIELD INC., Morgan Hill, CA (US)

(72) Inventor: Yuval Sadeh, Kibbutz Maayan-Baruch (IL)

(73) Assignee: SATYIELD INC., Morgan Hill, CA (US)

( * ) Notice: Subject to any disclaimer, the term of this patent is extended or adjusted under 35 U.S.C. 154(b) by 0 days.

(21) Appl. No.: 18/727,125

(22) PCT Filed: Jan. 5, 2023

(86) PCT No.: PCT/IL2023/050015
§ 371 (c)(1),
(2) Date: Jul. 8, 2024

(87) PCT Pub. No.: WO2023/131949
PCT Pub. Date: Jul. 13, 2023

(65) Prior Publication Data
US 2024/0420254 A1    Dec. 19, 2024

(30) Foreign Application Priority Data
Jan. 6, 2022   (IL) .......................................... 289666

(51) Int. Cl.
*G06Q 50/02* (2024.01)
*G06V 10/25* (2022.01)
(Continued)

(52) U.S. Cl.
CPC ............. *G06Q 50/02* (2013.01); *G06V 10/25* (2022.01); *G06V 10/803* (2022.01); *G06V 20/13* (2022.01); *G06V 20/188* (2022.01)

(58) Field of Classification Search
CPC ........ G06Q 50/02; G06Q 10/04; G06V 10/25; G06V 10/803; G06V 20/13; G06V 20/188;
(Continued)

(56) References Cited

U.S. PATENT DOCUMENTS

| 2003/0019408 A1* | 1/2003 | Fraisse ................. A01B 79/005 |
| | | 111/100 |
| 2012/0253740 A1* | 10/2012 | Rojas ..................... G01B 11/28 |
| | | 702/156 |

(Continued)

OTHER PUBLICATIONS

Allen et al. (Estimating crop coefficients from fraction of ground cover and height, 2009) (Year: 2009).*
(Continued)

*Primary Examiner* — Mohammad K Islam
(74) *Attorney, Agent, or Firm* — Roach Brown McCarthy & Gruber, P.C.; Kevin D. McCarthy

(57) ABSTRACT

A method for estimating crop yield of an analyzed area, which is a region of interest, according to which imagery data is acquired from one or more remotely sensed sources, using a remote sensing platform or one or more satellites. A remotely sensed LAI of the analyzed area is generated by fusing the acquired imagery data and the sowing date of the analyzed field is detected by processing the imagery data. The detected sowing date and a sowing date window are fed into a crop simulator (e.g., APSIM) and a set of predetermined parameters representing the state of the analyzed area is then generated, and fed into the crop simulator. The crop simulator generates a plurality of LAI simulations, each corresponding to a different combination of parameters. Only LAI simulations in which the simulated LAI best matches the remotely sensed LAI are identified and selected, while omitting all other LAI simulations. Finally, the yield prediction that corresponds to the simulation(s) with the best match, are selected.

13 Claims, 11 Drawing Sheets

(51) Int. Cl.
*G06V 10/80* (2022.01)
*G06V 20/10* (2022.01)
*G06V 20/13* (2022.01)

(58) Field of Classification Search
CPC ...... A01B 79/005; A01B 49/06; A01G 25/16; A01G 9/247; A01G 22/00; Y02P 60/21; Y02P 90/84
See application file for complete search history.

(56) References Cited

U.S. PATENT DOCUMENTS

| | | | |
|---|---|---|---|
| 2016/0171680 A1 | 6/2016 | Lobell | |
| 2019/0362258 A1* | 11/2019 | Azuma | G08G 1/0116 |
| 2020/0025741 A1* | 1/2020 | Rosen | G01N 33/24 |
| 2021/0235612 A1* | 8/2021 | Tewari | G06V 20/188 |
| 2023/0270060 A1* | 8/2023 | Pelta | A01G 25/16 |
| | | | 700/284 |
| 2024/0169721 A1* | 5/2024 | Karami | G06V 20/188 |

OTHER PUBLICATIONS

Ramos et al. (Assessing the Impact of LAI Data Assimilation on Simulations of the Soil Water Balance and Maize Development Using MOHID—Lan, 2018) (Year: 2018).*
International Application No. PCT/IL2023/050015, International Search Report and Written Opinion, mailed Mar. 26, 2023.
Gumma et al., "Assimilation of Remote Sensing Data into Crop Growth Model for Yield Estimation a Case Study from India", Murali Krishna Gumma, Oct. 1, 2020.
International Application No. PCT/IL2023/050015, International Preliminary Report on Patentability, dated Apr. 15, 2024.

* cited by examiner

VERSATILE CROP YIELD ESTIMATOR

FIELD OF THE INVENTION

The present invention relates to the field of food security. More particularly, the present invention relates to a method for accurately predicting crop yield, without requiring any prior knowledge.

BACKGROUND OF THE INVENTION

One of the major challenges in monitoring and managing food security is to provide reliable, consistent and scalable crop yield projections. Therefore, accurate production forecasts as early as possible prior to harvest are critical for market stability, as well as for farmers, grains companies and governments.

Climate variations and extreme weather conditions greatly affect future crop yields, potentially leading to severe food crises, risks and uncertainties within the global food system. Spaceborne remote sensing is considered to be a reliable source to improve crop yield prediction. Therefore, many yield prediction methods using satellite data have been developed. Most of these methods are based on the correlation between Vegetation Indices (VIs-mathematical combination or transformation of spectral bands that accentuates the spectral properties of green plants so that they appear distinct from other image features) and crop yield. However, reliance upon a unique and local relationship is not sufficient, especially when crops experience highly variable environmental conditions through space and time.

Other conventional methods combine satellite images and machine learning techniques. However, these methods often require a large amount of ground data from different sources, including yield, sowing dates, soil properties, cultivars, farm management practices and weather conditions, for training and calibrating the model. Such data is rarely available for yield estimation over large scales, such as at the district or country level, and therefore, these models are calibrated locally. Even though locally calibrated yield prediction methods may achieve good accuracy of yield estimation, they are usually limited to the area in which they were calibrated.

Despite the growing availability of Earth-observing data to monitor crop development and yield prediction, the use of spaceborne sensors is limited by the type of data they can retrieve. Optical remote sensing cannot see through the crop canopy or the soil surface but can, for example, provide valid information about canopy chlorophyll content. Synthetic Aperture Radar (SAR) can provide complementary data on the surface's roughness, slope, geometry and soil moisture.

Conversely, crop growth models can be used to simulate key physiological processes including phenology, organ development (of leaf and grain), water and nutrient uptake, biomass, and response to abiotic stresses (the negative impact of non-living factors on the living organisms in a specific environment). Therefore, combining the capabilities of remote sensing with crop model simulations can improve the capabilities of monitoring crop development and yield estimation through space and time.

One of the ways to combine the abilities of crop modelling and remotely sensed data is by integrating the Leaf Area Index (LAI) into the models. LAI which defines as the ratio of one-sided leaf area per unit ground area is considered an important plant characteristic. LAI has been found to be a good indicator of crop status and leaf abundance, as well as phenological stage, and can be used as an indicator of different farm management methods, or the impact of stresses and pests. Therefore, LAI also plays an important role in crop monitoring and can be used in crop growth models to better forecast yield.

Knowing the LAI of a crop has a wide range of applications. However, monitoring crop LAI by extensive in-situ sampling over large areas is expensive, time-consuming and consequently impractical. Therefore, many efforts were made to estimate LAI from space.

As crop canopy reflectance is affected by the LAI, as well as by the chlorophyll distribution, canopy structure and the background soil. Methods which rely on optical remote sensing to convert surface reflectance data into LAI estimations were developed. LAI has been found to be a good indicator of crop status and leaf abundance, as well as phenological stage, and can be used as an indicator of different farm management practices, or the impact of biotic and abiotic stresses.

One way of using LAI to predict crop yield is by identifying a linear correlation between LAI (often at its maximum seasonal value) and the reported final yield. However, LAI by itself is limited as a linear indicator for the crop's yield as this may be due to failure of plant development, biotic or abiotic stresses. That also applies to the limited linear relationship between the VIs peak and the final yields.

Combining the abilities of remotely sensed data and crop models can be done for example, by using data assimilation of LAI into crop model simulations. However, both these data assimilation techniques and identifying a linear correlation between LAI and yield, require local calibration through in-situ measurements, which limit their ability to estimate crop yield over large areas or in environments different from where the calibration data was collected.

Few studies attempted to estimate yields without any ground-based data for calibration, but achieved limited success. Therefore, a new method to perform global yield monitoring that combines earth observation data with data generated from crop growth models, without the need for in-situ yield measurement, is required.

It is therefore an object of the present invention to provide a system and method for estimating crop yield from the pixel, field and to regional scales, without relying on ground data for calibration.

It is another object of the present invention to provide a system and method for generating yield maps at the pixel level, without relying on ground data for calibration.

It is a further object of the present invention to provide a system and method for estimating crop yield that does not require any crop statistics or in-situ measurements.

It is still another object of the present invention to provide a system and method for estimating crop yield from the pixel, field and to regional scales, which is broadly applicable across regions, where ground calibration data are not available.

Other objects and advantages of the invention will become apparent as the description proceeds.

SUMMARY OF THE INVENTION

A method for estimating crop yield of an analyzed area, being a region of interest, comprising the steps of:
  a) acquiring imagery data from one or more remotely sensed sources, using a remote sensing platform or one or more satellites;
  b) generating a remotely sensed LAI of the analyzed area by fusing the acquired imagery data;

c) detecting the sowing date of the analyzed field by processing the imagery data;
d) feeding the detected sowing date, a sowing date window, into a crop simulator (e.g., APSIM, SAFY, DSSAT; WOFOST or AquaCrop);
e) generating a set of predetermined parameters representing the state of the analyzed area and feeding the set into the crop simulator;
f) generating, by the crop simulator, a plurality of LAI simulations, each of which corresponds to a different combination of parameters;
g) identifying and selecting only LAI simulations in which the simulated LAI best matches the remotely sensed LAI, while omitting all other LAI simulations; and
h) selecting the yield prediction that corresponds to the simulation(s) having the best match.

The parameters to be fed into the crop simulation may be:
weather data retrieved from nearest weather station;
soil data based on the nearest soils;
initial water content;
fertilization data at sowing;
fertilization data during the season;
types of cultivars;
plant population.

The data extracted from images or fused data may be used to create daily LAI datasets at a predetermined resolution.

The harvest date of the analyzed area of interest may be detecting similarly to the detection of the sowing date, at the end of the season.

In one aspect, LAI simulations are selected according to the following steps:
a) finding the highest remotely sensed LAI values being above a predetermined threshold (e.g., 1-100%), during the season and their timing;
b) for each LAI simulation, extracting only the simulated LAI that fall within the duration of the highest remotely sensed LAI values.
c) for each LAI simulation:
  c.1) calculating the gap in LAI between the maximal simulated LAI and remotely sensed LAI;
  c.2) calculating the gap in days between the timing of maximal simulated LAI and maximal remotely sensed LAI;
  c.3) calculating the RMSE between simulated and remotely sensed green LAI, representing the stages when the leaves are photosynthetically active;
  c.4) calculating the RMSE between simulated and remotely sensed senescence LAI, representing the stages when the leaves are not photosynthetically active, in the range between the maximum remotely sensed LAI and 1;
d) selecting only the simulations with the lowest percentage gap in LAI between the maximum simulated LAI and remotely sensed LAI;
e) from the simulations selected in the preceding step, selecting only the simulations with a gap in days between the timing of the maximal simulated and remotely sensed LAI that is within a range of +/− predetermined number of days;
f) if none of the LAI simulations complies with this rule, increasing the range, until obtaining compliance;
g) selecting only the simulations that will be within the highest percentage of the average simulated senescence LAI of the selected simulations in the preceding steps; and h) setting the estimated yield of the area of interest (e.g. a field) to be the average of the simulations with the lowest RMSE of 10-60% between simulated and remotely sensed Green LAI.

In one aspect, whenever the maximum remotely sensed LAI is lower than 0.9, setting the estimated yield to be the average of LAI simulations having the lowest yield estimation.

In one aspect, whenever step g) above results with less than 10 simulations, the estimated yield is set to be the average of all these simulations, without executing step h) above.

Estimation may be performed by:
a) using a sowing window with no inputs regarding detected sowing dates as inputs;
b) coupling the remotely sensed sowing dates and Leaf Area Index (LAI) datasets with the crop simulator.

Data fusion of SAR imagery with optical imagery may be performed for more accurate estimation and monitoring of crops LAI.

Yield estimation may be performed from the pixel level to any region of interest.

Estimations may be performed according for one or more of the following simulator outputs:
Biomass;
plant carbon level;
plant phenology;
crop nitrogen level;
grain protein level;
grain size and number;
soil water;
soil nutrients;
soil carbon level;
plant available water.

A system for estimating crop yield of an analyzed area, being a region of interest, comprising:
a) one or more remotely sensed sources in the analyzed area, from which imagery data is being acquired;
b) a remote sensing platform or one or more satellites, for acquiring the imagery data;
c) a computerize device with at least one processor, being adapted to:
  c.1) generate a remotely sensed LAI of the analyzed area by fusing the acquired imagery data;
  c.2) detect the sowing date of the analyzed field by processing the imagery data;
  c.3) feed the detected sowing date, or a sowing date window, into a crop simulator;
  c.4) generate a set of predetermined parameters representing the state of the analyzed area and feeding the set into the crop simulator;
  c.5) generate, by the crop simulator, a plurality of LAI simulations, each of which corresponds to a different combination of parameters;
  c.6) identify and select only LAI simulations in which the simulated LAI best matches the remotely sensed LAI, while omitting all other LAI simulations; and
  c.7) select the yield prediction that corresponds to the simulation(s) having the best match.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PRESENT INVENTION

Figure 1:
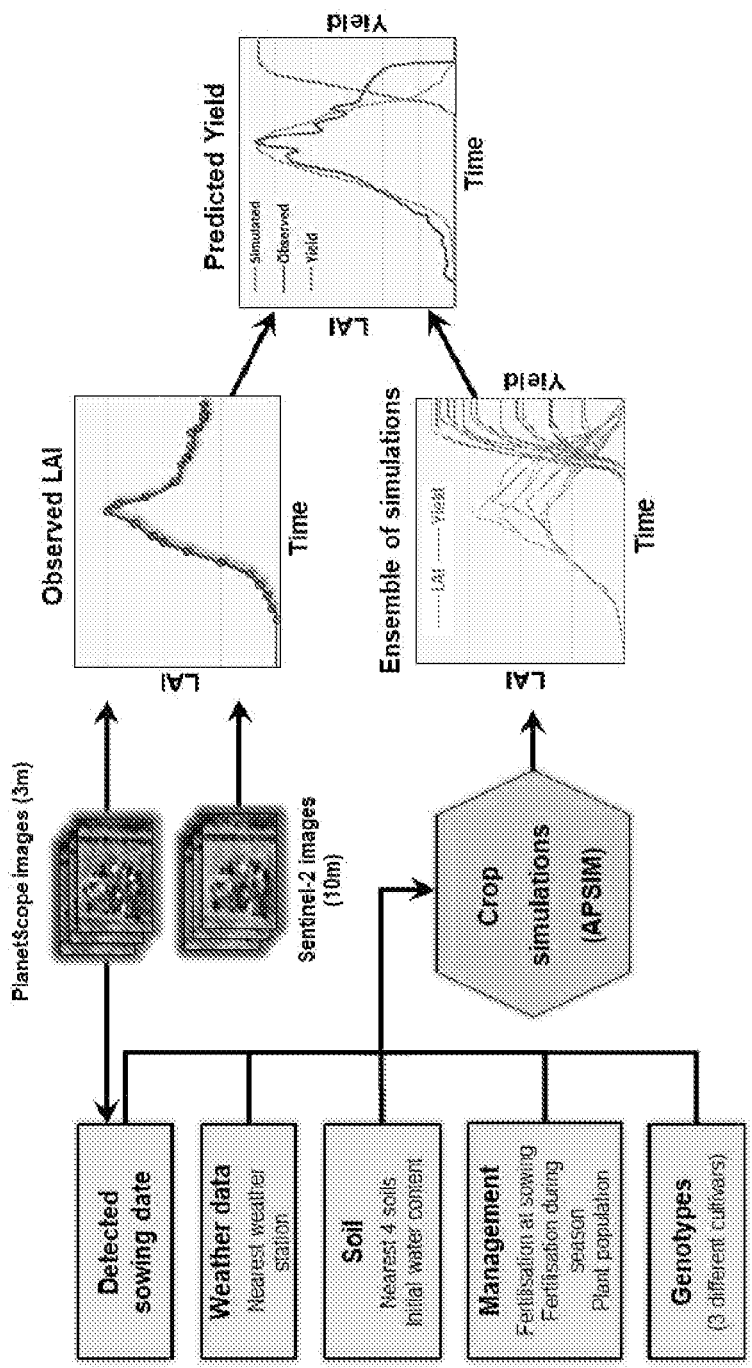
FIG. 1 illustrates a field-scale yield prediction workflow, according to an embodiment of the invention.

The present invention provides a system and method for estimating crop yield from the pixel, to regional scales (of an analyzed area), without relying on ground data for calibration. The method uses the LAI as the linking parameter between the remotely sensed data (for example, by satellites or by other remote sensing platforms, such as ground-based, airborne or spaceborne platforms) and a model for plant development and crop yield prediction. Such a model may be, for example, the Agricultural Production Systems sIMulator (APSIM—is a comprehensive model developed to simulate biophysical processes in agricultural systems, particularly as it relates to the economic and ecological outcomes of management practices in the face of climate risk—developed by the Agricultural Production Systems Research Unit, a collaborative group made up from Commonwealth Scientific and Industrial Research Organisation and Queensland State Government agencies). Other crop models, such as the Simple Algorithm For Yield estimate (SAFY), the Decision Support System for Agrotechnology Transfer (DSSAT—is a set of computer programs for simulating agricultural crop growth DSSAT, Jones et al., European Journal of Agronomy, 2003), the WOrld FOod Studies model (WOFOST—is a simulation model for the quantitative analysis of the growth and production of annual field crops) and AquaCrop (is a crop growth model developed by the Land and Water Division of the Food and Agriculture Organization to assess the effect of environment and management on crop production) may be used, as well.

According to one embodiment, the proposed method includes the following steps:

1. A remotely sensed (e.g., by using CubeSats) sowing date detection method was developed to identify cultivated fields and the date when they were sown. It is noted that the word "sow" and its derivatives are used in a generic sense to include planting, i.e. it is intended the terms such as "sowing date" can be replaced with "planting date"

2. Fusion of images creates daily LAI datasets at 3 m resolution.

3. Coupling the sowing dates and Leaf Area Index (LAI) datasets with the Agricultural Production Systems sIMulator (APSIM).

4. Detection of the harvest date for each field using the same methodology as for the sowing date detection, but at the end of the season.

Alternatively, the proposed method can use a sowing window, without receiving detected sowing dates as inputs, and perform only the step of coupling Leaf Area Index (LAI) datasets with the Agricultural Production Systems sIMulator (APSIM).

Sowing and Harvest Date Detection:

The sowing dates for each field were extracted using a semi-automated sowing date detection.

The change between two consecutive images is given by:

$$\text{Change} = \text{Image}_{t_2}^{PC_1} - \text{Image}_{t_1}^{PC_1} \quad [\text{Eq.1}]$$

where $\text{Image}_{t_1}^{PC_1}$ is the first principal component of the earlier satellite image and $\text{Image}_{t_2}^{PC_1}$ is the first principal component of the later satellite image.

It is possible to detect the harvest dates and the field area that had been harvested between two consecutive images. It was found that the sowing date detection method was effective in detecting the harvested area of the field, by modifying Eq. 1 to:

$$\text{Change} = \text{Image}_{t_1}^{PC_1} - \text{Image}_{t_2}^{PC_1} \quad [\text{Eq. 2}]$$

where here the $\text{Image}_{t_1}^{PC_1}$ is the first principal component of the earlier satellite image and $\text{Image}_{t_2}^{PC_1}$ is the first principal component of the later satellite image. This modification was required, since sowing often corresponds to a change in color from bright to dark, while at harvest, the field changes from dark brown to the light brown-yellow color of the crop residue.

In this example, as well, the proposed method can use a sowing window, without using detected sowing dates.

FIG. 1 illustrates a field-scale yield prediction workflow, according to an embodiment of the invention. At the first step, imagery data from PlanetScope and Sentinel-2 satellites are acquired and fused into a remotely observed LAI of the analyzed field. At the next step, the sowing date of the analyzed field is detected by processing the imagery data (using a computerized device with at least one processor). At the next step, the sowing date is fed into a crop simulator (such as APSIM) along with other parameters, such as weather data retrieved from the nearest weather station, soil data including nearest soils and initial water content, fertilization data at sowing and during the season, as well as several cultivars. At the next stage, the crop simulator generates a plurality of simulations, each of which corresponds to a different combination of parameters. At the final stage, the simulations in which the simulated LAI best matches the remotely sensed LAI are identified and selected. The most accurate yield prediction will correspond to the simulation (s) with the best match.

APSIM crop model allows running numerous possible scenarios that represent a realistic range of environmental conditions and farm management practices. This helps to overcome the gaps in knowledge of the farm management practices used in specific fields and the environmental conditions at the region of interest. As part of this process, about 2,000 simulations of APSIM are generated for each field, as shown in FIG. 1. The weather data were taken from the nearest weather station and the soil properties from the four nearest soils available in the APSoil database (www.apsim.info/apsim-model/apsoil/), which is related to Australia. However, other databases may be used, as well. Each APSIM simulation outputs daily crop characteristics including LAI as well as a grain yield estimation (kg/ha). Simulations that best reflect the LAI evolution were selected using an automatic rule-based algorithm (to be described below) to estimate the likely final yield.

To simulate the range of plausible scenarios for each studied crop, the following information was used:

Weather data—The weather records were downloaded from the nearest weather station to the field from the SILO database (a database of historical climate data for Australia). However, other databases may be used, as well.

Sowing date—the sowing dates used in APSIM were the dates detected using, for example, the sowing date detection method described in Sadeh et al, "Sowing date detection at the field scale using CubeSats remote sensing", 2019, Computers and electronics in agriculture, 157, pages 568-580. These sowing dates were also used as the start date for APSIM simulations.

Soil characteristics—Wheat crops are mostly grown under rain-fed conditions and so heavily rely on water available in the soil profile. Therefore, choosing an appropriate soil to represent the field is important to obtain reliable results. Soil characteristics were sourced from the APSoil database (a repository of soils developed for use by the APSIM cropping systems model). APSoil is focused on the physical and chemical soil characteristics that drive crop production, particularly soil water and crop nutrition. The nearest 4 soil types were used alternatively to generate the simulations. This increased the likelihood to consider a soil with similar properties as the soil from the field of interest.

Cultivars—for each field, three cultivars were chosen to represent early, mid, and late-maturing cultivars from the region and by analyzing the popular cultivars used by farmers in each region.

Initial soil water—The soil water at the start of the simulation was set as 20%, 50% or 100% of the plant available soil water capacity of the soil, with the soil profile filled from the top (typically due to rainfall refilling the soil during the intercropping season).

Fertilization at sowing—Farmers commonly fertilize the soil at sowing, however, the rate of fertilizers used typically varies across regions. Three different rates were used to cover the range from current common practice in Australia. Those were 30, 50 or 100 kg/ha of nitrogen, in the form of $NO_3$.

Fertilization during the season—Similar to the fertilization at sowing, the rate of fertilizers used by farmers during the growing season typically vary across regions of the wheat belt but also depends on seasonal rainfall. As the actual dates of the fertilization are unknown for the studied fields, different optional rates were applied in the simulations to cover common practice in Australia. These rates were 0, 30 or 60 kg/ha of $NO_3$ at the stage of stem elongation. Plant population/density (the number of individual plants per unit of ground area, was set at 50, 100 and 150 plants per $m^2$, based on common practices.

Imagery data streams provided by PlanetScope (is a satellite constellation that consists of more than 130 small satellites. Each Dove satellite is a CubeSat made of three cubic units and thus measures only 10 cm×10 cm×30 cm. The satellites are launched in groups, which constantly improves the mission's characteristics such as revisit times, spatial and spectral resolutions) and Sentinel-2 (is an Earth observation mission that systematically acquires optical imagery at a high spatial resolution of 10-60 m over land and coastal waters. The mission is currently a constellation with two satellites) were fused into daily 3 m LAI (according to the method described in Sadeh et al: "Fusion of Sentinel-2 and PlanetScope time-series data into daily 3 m surface reflectance and wheat LAI monitoring", International Journal of Applied Earth Observation and Geoinformation, 2021) was used to generate a times-series of LAI for each of the fields analyzed.

The APSIM model simulation was coupled with remotely sensed LAI for field-scale yield estimations. For each field, about 2,000 different simulations of APSIM were generated spanning a realistic range of possible environmental and on-farm variables. Simulations that were the most likely to accurately predict the yield of the field of interest were selected.

Figure 2:
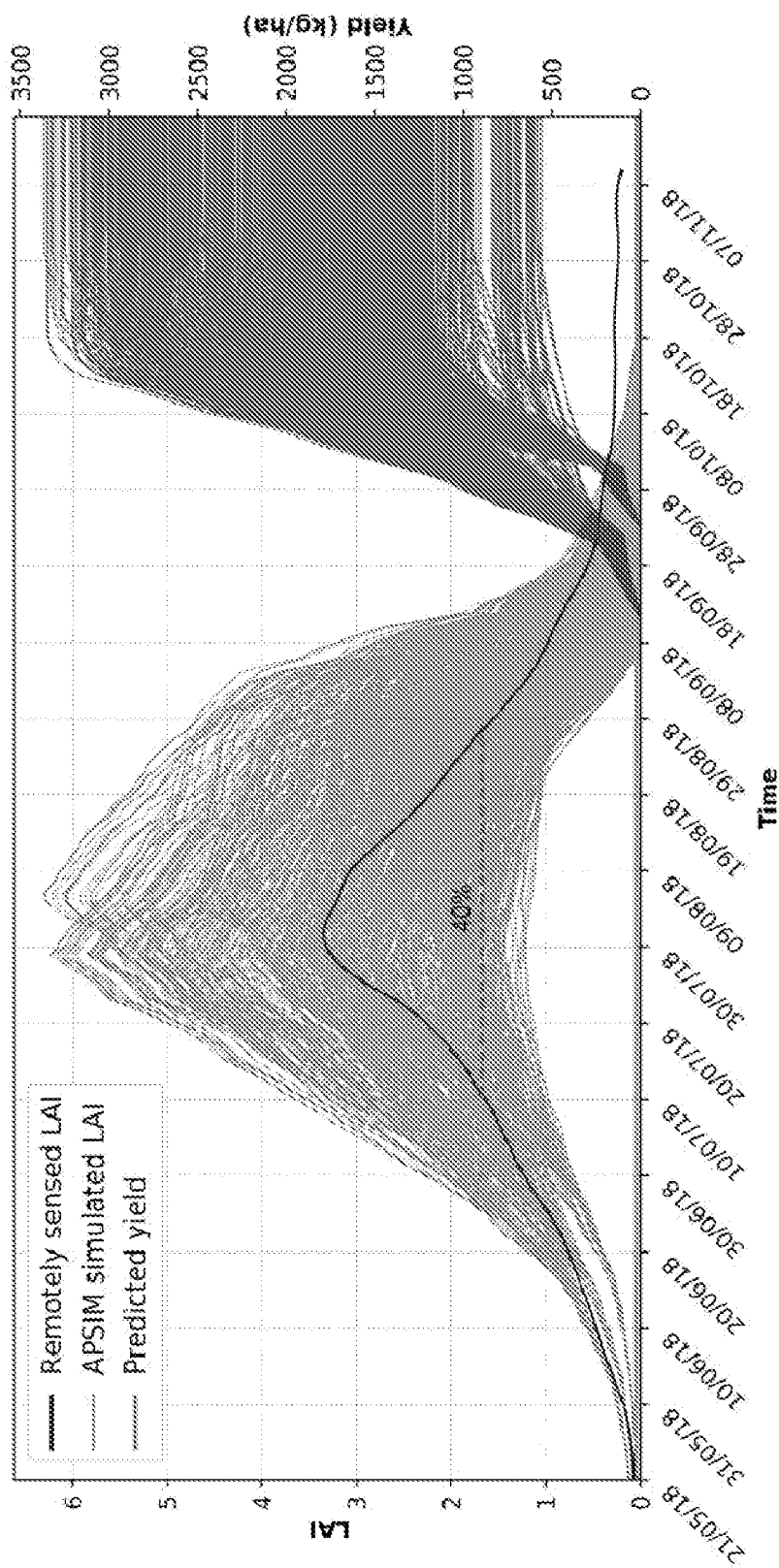
FIG. 2 illustrates an example of about 2,000 different simulations of APSIM that were generated for a field.

All the selection steps were focused on LAI data around the field's peak LAI, within a target time window when the Remotely Sensed (RS) LAI values were ≥60% of the RS max LAI ($LAI_{max}$), as shown in FIG. 2. FIG. 2 illustrates an example of about 2,000 different simulations of APSIM that were generated for a field, spanning a realistic range of possible environmental and on-farm variables. The green lines represent the simulated LAI and the blue lines represent their corresponding yield predictions. The remotely sensed LAI in black and the dashed red line illustrates the field's highset 40% of the remotely sensed LAI values during the growing season. The highset 40% were used to select APSIM simulation with the most-similar LAI patterns, and estimate the range of plausible yields.

Simulations were selected according to the following steps:

Step 1: Finding the highest 40% of the remotely sensed LAI values during the season and their timing. The threshold 40% was chosen following sensitivity tests which showed that there is no need of using the entire season data to produce an accurate yield estimation. However, the threshold can range between 1-100%.

Step 2: For each APSIM simulation, extracting only the simulated LAI that fall within the duration of typically, the highest 40% of the remotely sensed LAI values. Of course, other ranges between 1-100% may be used.

Step 3: For each APSIM simulation:
A. Calculating the gap in LAI between the maximal simulated LAI and remotely sensed LAI (e.g. on the Y-axis).
B. Calculating the gap in days between the timing of maximal simulated LAI and max RS LAI (e.g. on the X-axis).
C. Calculating the Root Mean Squared Error (RMSE) between simulated and RS Green LAI, representing the stages when the leaves are photosynthetically active, in the range of 1 to maximum RS LAI<0.9.
D. Calculating the RMSE between simulated and Remotely sensed senescence LAI, representing the stages when the leaves are not photosynthetically active, in the range between the maximum RS LAI and 1.

Figure 3:
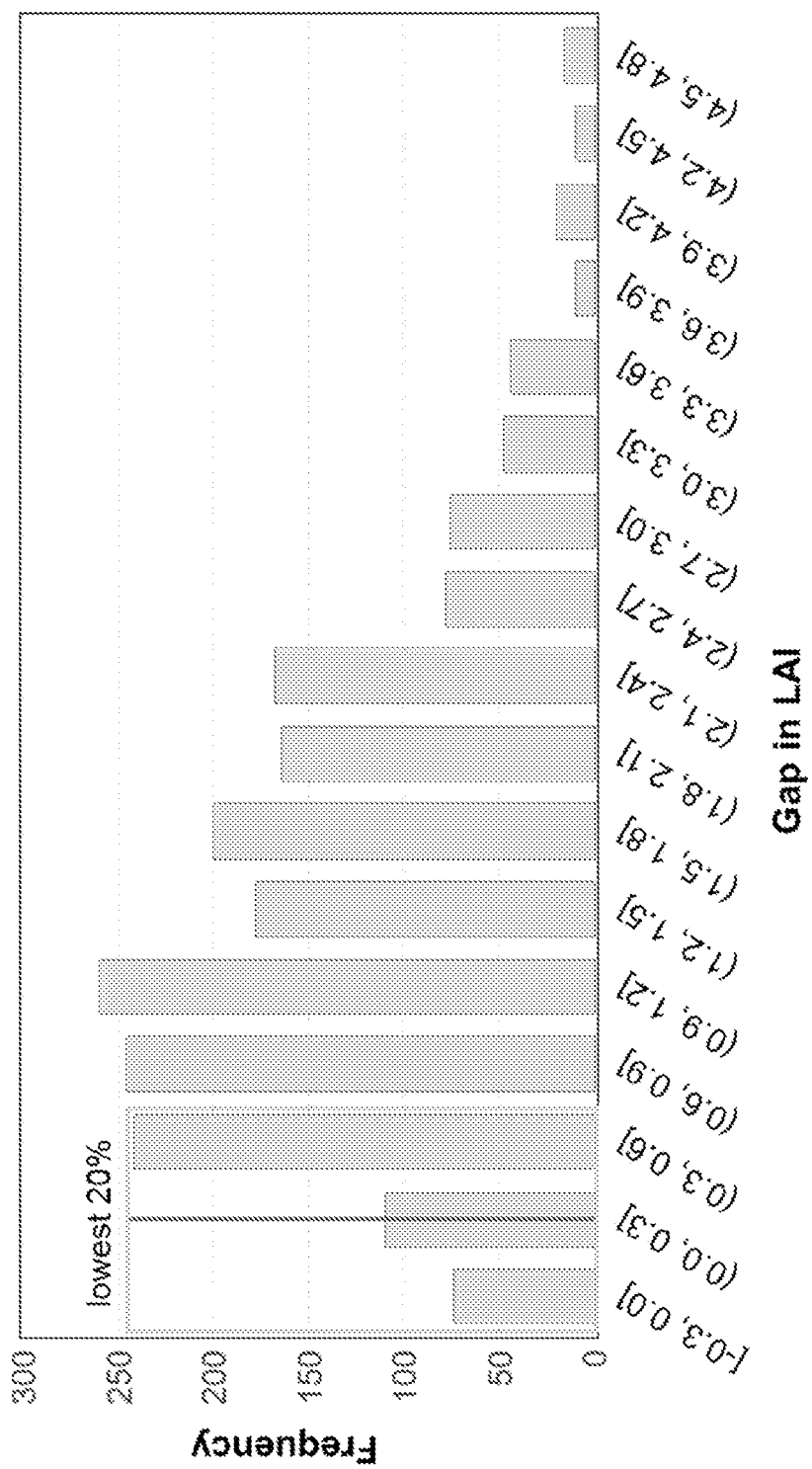
FIG. 3 illustrates the selection process of the lowest 20% gaps between the season's maximum (peak) of simulated LAI and the maximum RS LAI and shows the histogram of all the gaps calculated for a specific field.

Step 4: Selecting only the simulations with the lowest percentage gap in LAI between the maximum (peak) simulated and RS, as shown in FIG. FIG. 3 illustrates the selection process of the lowest percentage gaps between the season's maximum (peak) of simulated LAI and the maximum RS LAI and shows the histogram of all the gaps calculated for a specific field, when the yellow box represents the simulations which have the lowest 20% values, while the red line represents a perfect match between the maximum simulated LAI and the maximum RS LAI (i.e. gap=0 LAI).

Figure 4:
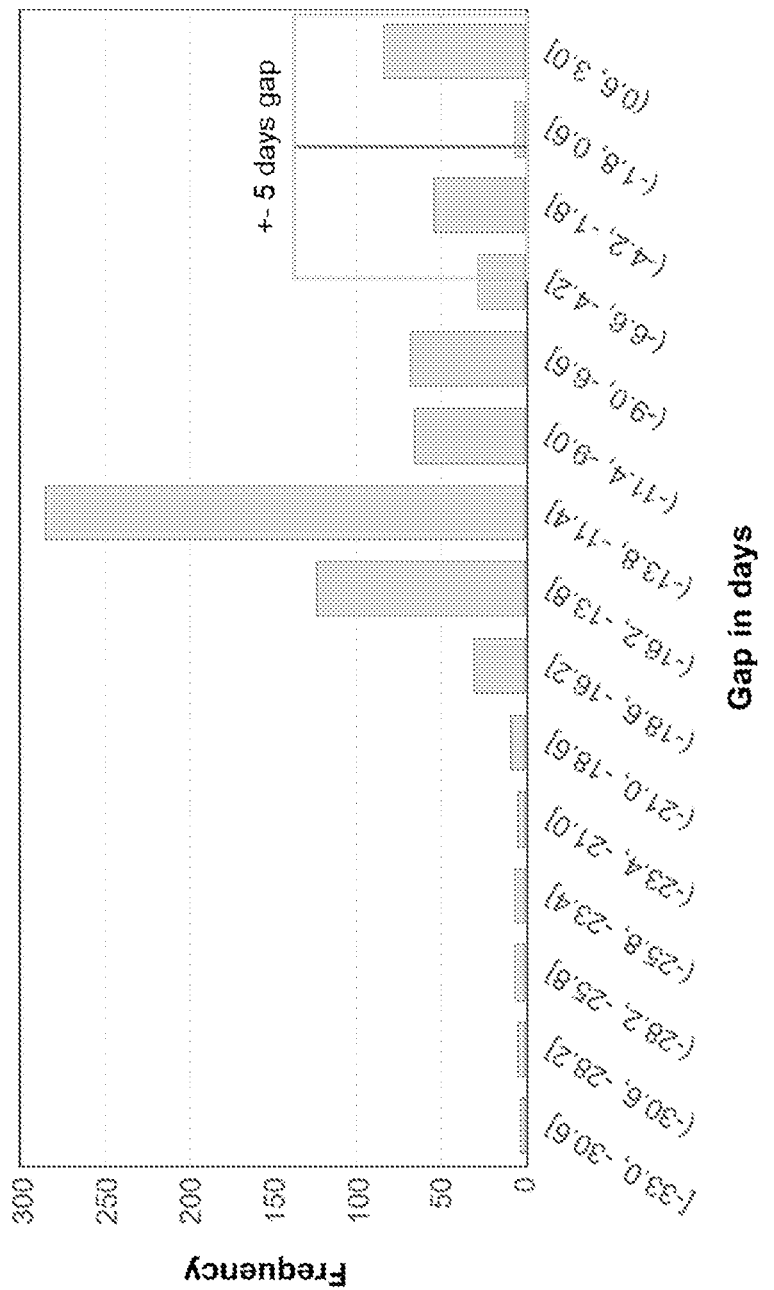
FIG. 4 shows the histogram of the gap in days between simulated and RS LAI of all the selected simulations.

Step 5: From the simulations selected in Step 4, selecting only the simulations with a gap in days between the timing of the maximal simulated and RS LAI that is within a range of +−5 days. If none of the simulations complies with this rule, then the selection range will increase to +−10 days gap between the timing of the maximal simulated and RS LAI. If still none of the simulations complies with this rule, then the range will increase to +−15, 20, 25 and eventually 30 days, as shown in FIG. 4. FIG. 4 shows the histogram of the gap in days between simulated and RS LAI of all the selected simulations. This histogram illustrates the selection rule of the simulations in which their gap in days between the timing of the maximal simulated and RS LAI is within the range of +−5 days gap (the yellow box). The red line represents a perfect match between the timing of the maximum simulated LAI and the maximum RS LAI (i.e. gap=0 days).

Step 6: Selecting only the simulations that will be within the highest percentage of the average senescence LAI of the selected simulations in the previous steps (gap in days and LAI between the LAI peaks), in order to overcome the underestimation of the remotely sensed senescence LAI. The threshold of 10-60% resulted from sensitivity tests conducted to evaluate which percentage of the RMSE between the senescence LAI and the remotely sensed senescence LAI would best perform in this process. The sensitivity tests aimed to identify the smallest possible percentage in order to minimize the sample size of the data analyzed to save processing time. This step divides the remotely-sensed LAI series into two, Green LAI and Senescence LAI, and analyses each of them separately.

Figure 5:
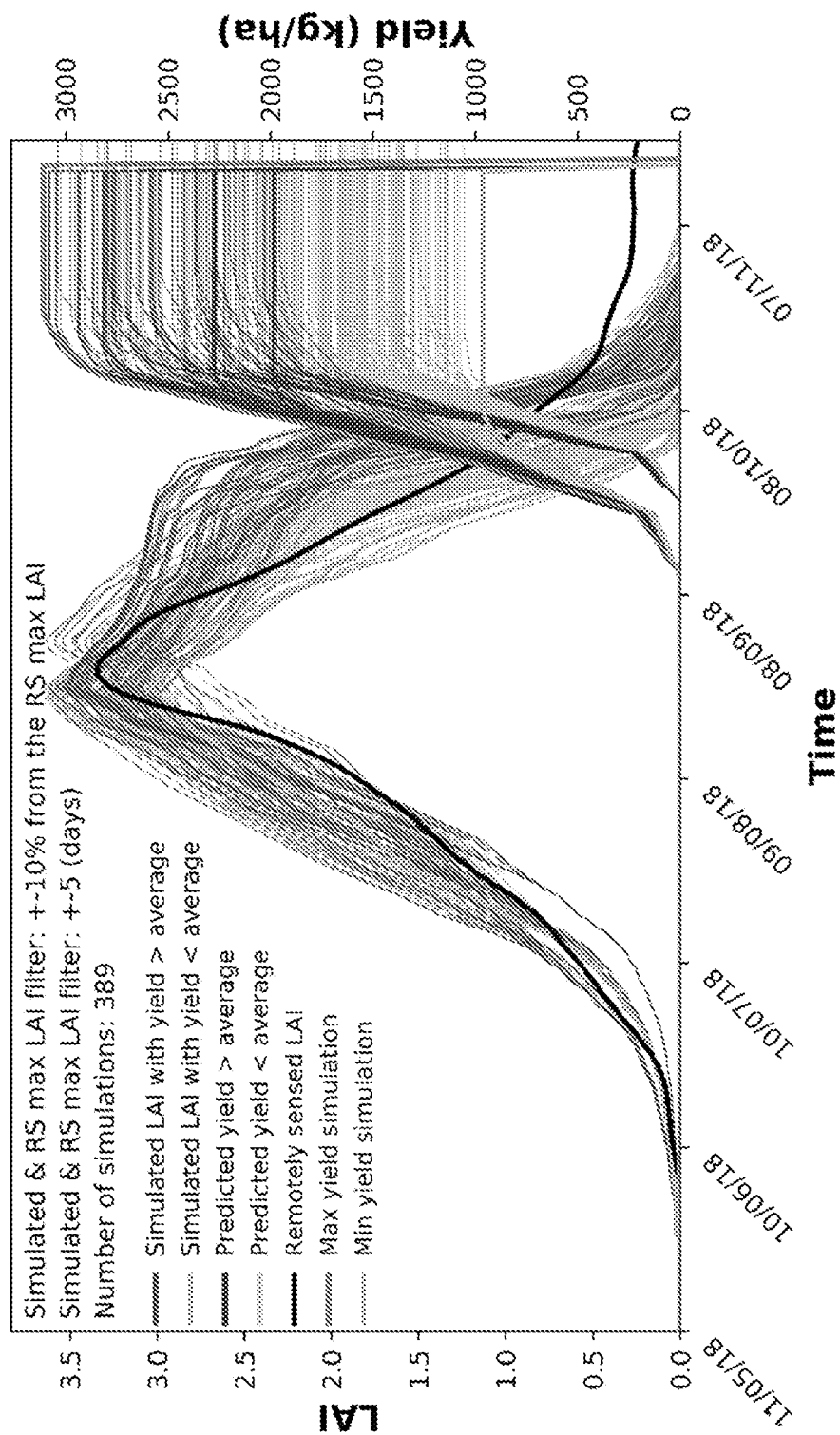
FIG. 5 shows a breakdown of the simulated LAI and their associated estimated yield.

A breakdown of the simulated LAI and their associated estimated yield is shown in FIG. 5, in which the remaining 389 APSIM simulations (out of about 2,000 initial simulations), which resulted from the gap in maximal LAI value and timing filters (steps 4 & 5 above) are plotted. In FIG. 5, the simulations for which their estimated yield ended to be above the average of all about 2,000 simulations are colored in a darker color (dark green for simulated LAI and dark blue for its associated estimated yield) than the simulations which their estimated yield ended to be below the average (light green for simulated LAI and light blue for its associated estimated yield). The simulation that resulted in the lowest yield is highlighted in orange while the simulation that resulted in the highest yield is highlighted in red.

Figure 6:
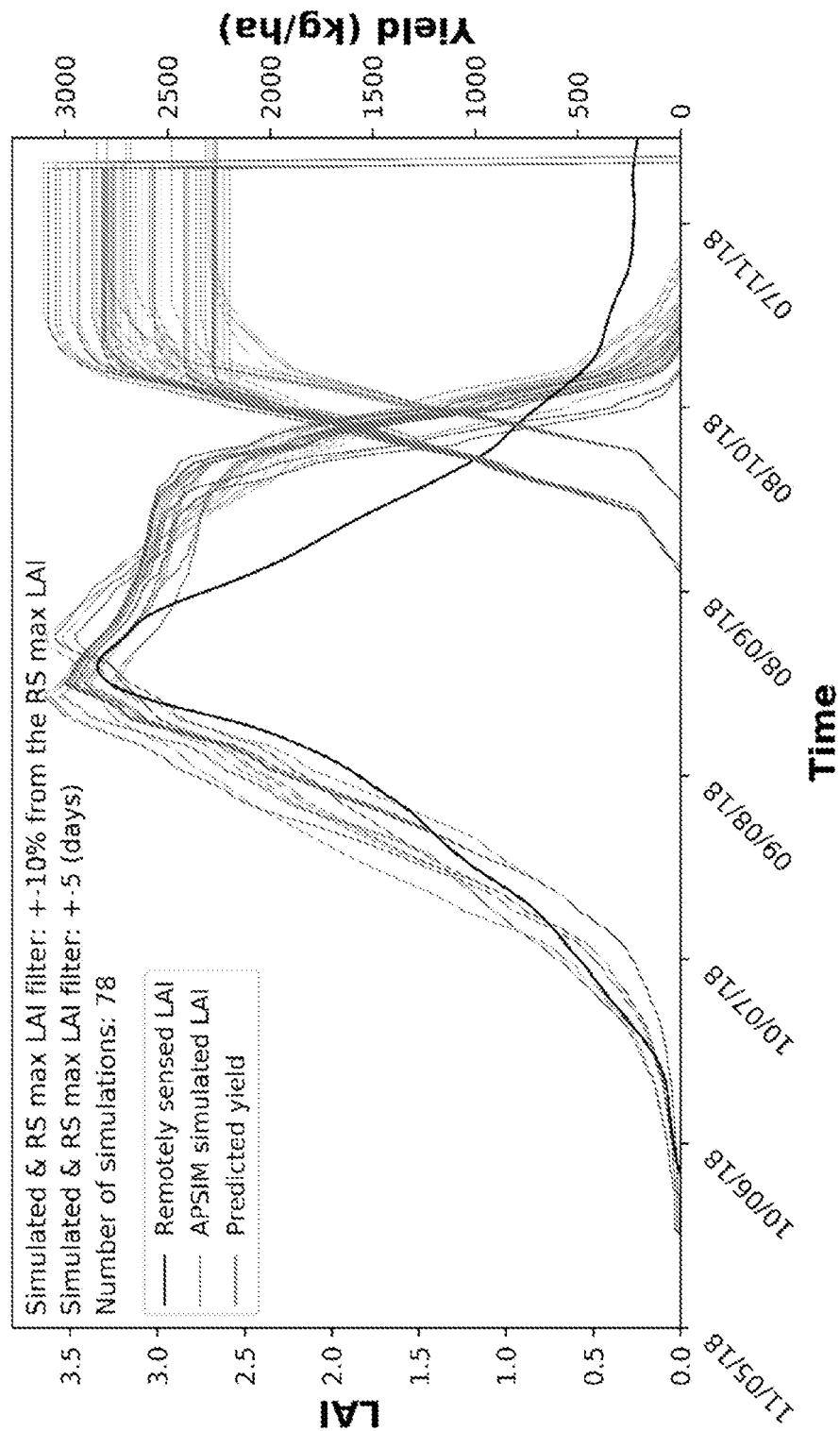
FIG. 6 shows the simulations which met the election conditions.

FIG. 5 also shows that a clear trend on which simulation will result in a higher, and therefore more accurate, yield estimation at the green LAI stage could not be seen. However, at the senescence stage, a clear trend was found with the simulations having a low senescence LAI likely to result in lower yield estimation, while no clear correlation could be seen for green LAI and yield. The result of this rule (Step 6) is illustrated in FIG. 6. FIG. 6 shows the simulations which met all the conditions in the previous steps. In this example, 78 simulations were selected out of 389 in step 5.

Step 7: Setting the estimated field-scale yield to be the average of the simulations with the lowest RMSE of 10-60% between simulated and remotely sensed Green LAI (low RMSE represents a good match between the simulated and remotely sensed LAI).

Figure 7:
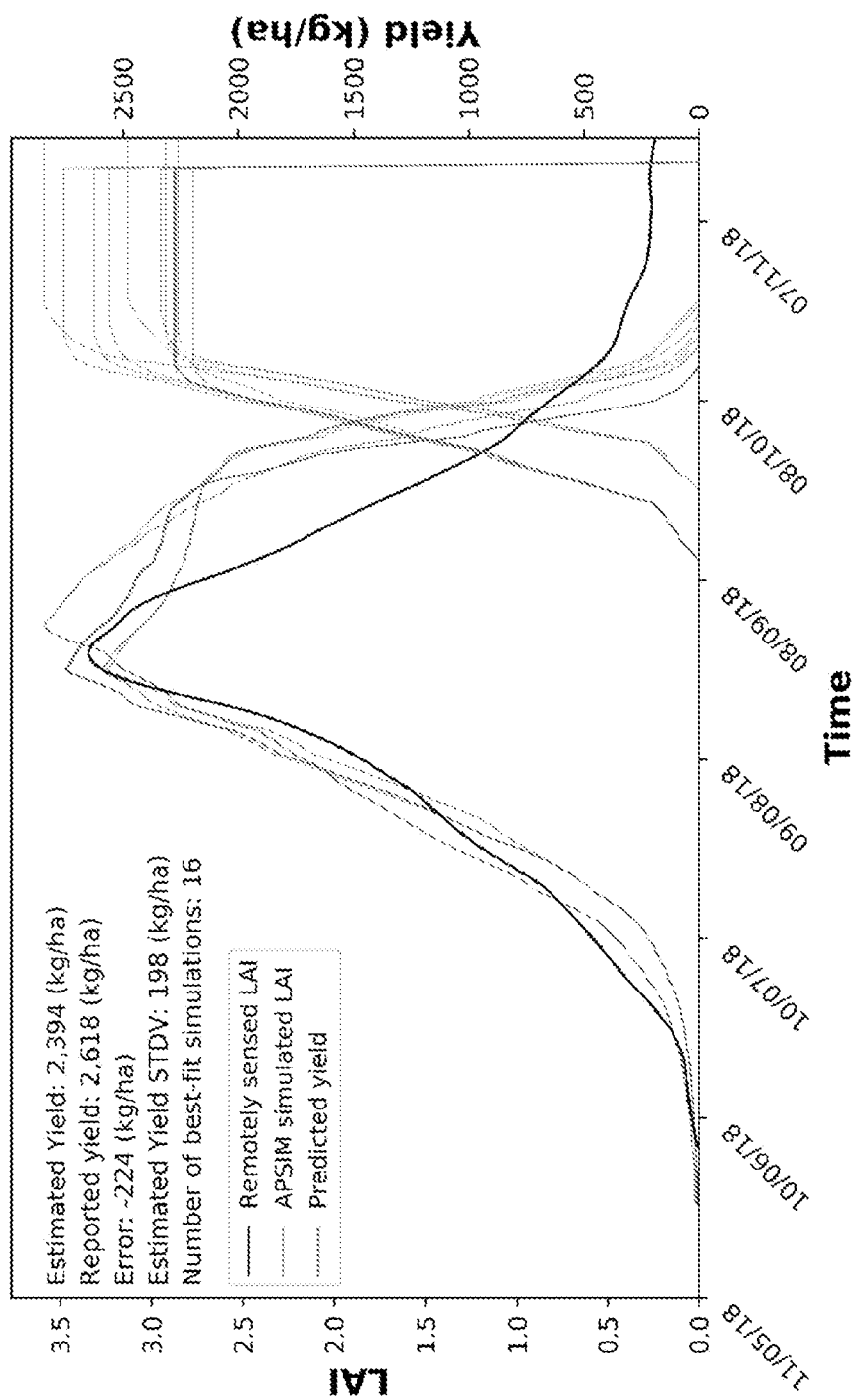
FIG. 7 shows an example of the output of the field-scale yield prediction.
Figure 8:
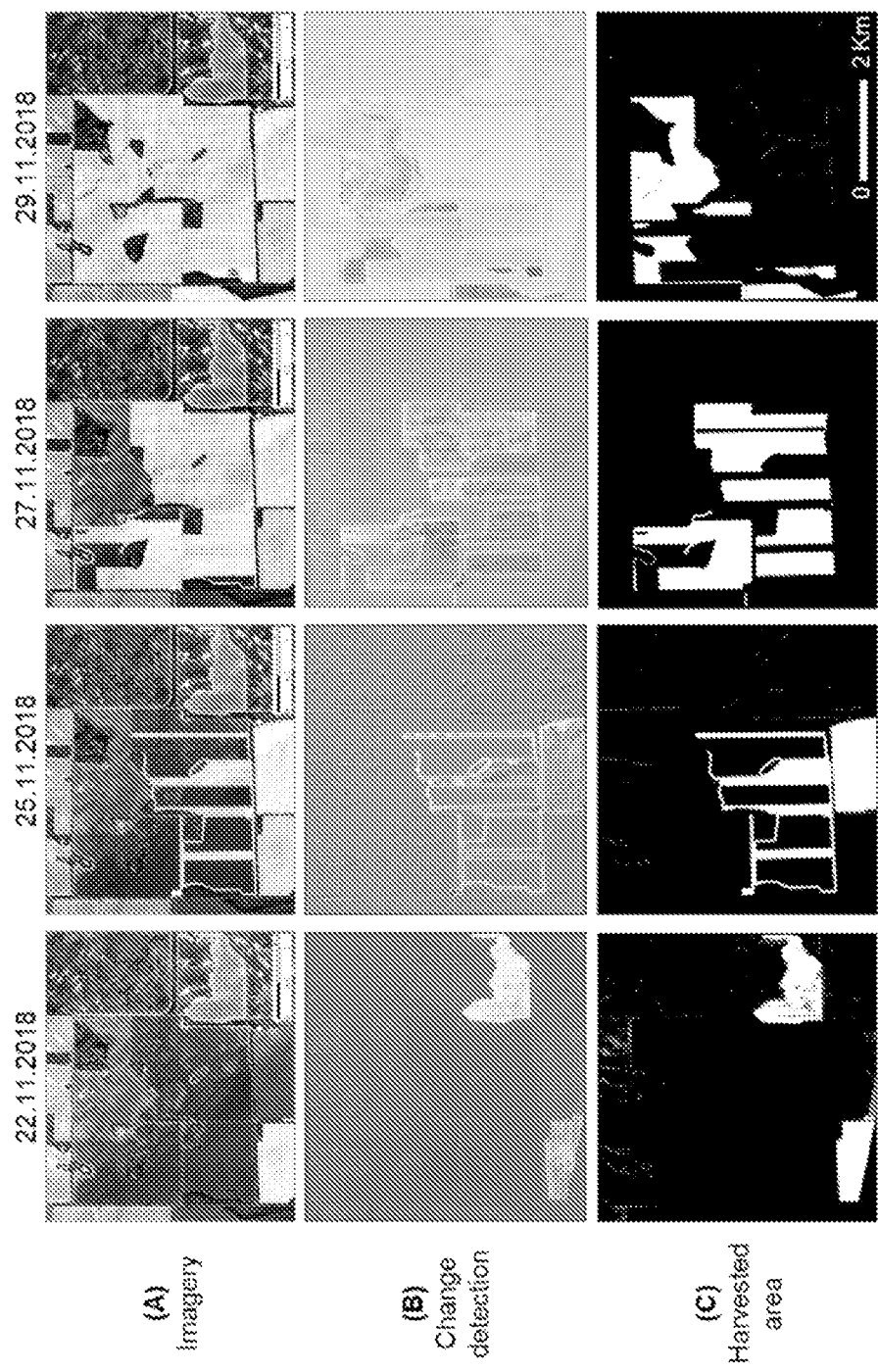
FIG. 8 illustrates the harvest detection of a farmland 1,400 ha in size, using four PS images taken over eight days.

An example of the output of the field-scale yield prediction is shown in FIG. 7. In order to cover different scenarios, if step 6 results with less than 10 simulations, then the estimated yield is set to be the average of all these simulations, i.e. without applying Step 7.

In the scenario of an extremely low yield (such as during a severe drought), the ability to accurately estimate LAI using satellites is very limited. While crop models will still simulate crops with very low LAI in such scenarios, the extreme under-developed crop surrounded by bare soil is typically associated with a reduced remotely sensed LAI dramatically owing to the mixed pixel effect (Gao et al.: "Simple method for retrieving leaf area index from Landsat using MODIS leaf area index products as reference", Journal of Applied Remote Sensing, 2012). Such crops typically have a very low yield and therefore should be addressed as a worst-case scenario. Consequently, in case that the maximum remotely sensed LAI was lower than 0.9, the estimated yield is set to be the average of the three simulations with the lowest yield estimation.

The proposed method identifies the simulations in which the simulated LAI best matches the remotely sensed LAI. This potentially enables farm management practices used as inputs in these selected simulations, to be identified.

The proposed method also predicted yield at the pixel level two to four months before the harvest. This was done using the 3 m daily LAI maps produced from the fusion between PS and S2, which was converted to yield at the pixel level. In this process, a Conversion Factor (Eq. 3) was used to convert LAI maps to yield maps (kg/ha). The CF was calculated as:

$$\text{Conversion Factor} = \frac{\text{Estimated Yield}}{\text{Remotely Sensed } LAI_{max}} \quad [\text{Eq. 3}]$$

where Estimated Yield is the estimated field-scale yield, and Remotely Sensed $LAI_{max}$ corresponds to the season's maximum field-scale median LAI value from the remotely sensed LAI map, for the day when RS LAI was detected as being the maximum, within that field, during the growing season. At the next stage, each pixel of the LAI map (of the remotely sensed $LAI_{max}$) was multiplied by the CF, which converted the LAI values into yield (kg/ha) at the pixel level. In this example, the process resulted in a yield map at a spatial resolution of 3 m. However, other resolutions of the input LAI dataset may be used.

Implementation of the proposed method resulted in the detection of all 20 analyzed fields. Furthermore, there was only an average-0.1-day gap (0-day gap for the median) between the detected and the reported harvest dates (RMSE=2.6 days).

The ability of the method proposed by the present invention to estimate yield at the field-scale was tested over 27 fields, using (i) the fused 3 m daily LAI time-series which is equivalent to the generic S2-LAI (original) as well as (ii) the fused LAI time-series which was adjusted to better estimate wheat Green LAI (corrected).

The results shown in Table 1 indicate that when using the fused-LAI equivalent to the original generic S2-LAI, the method proposed by the present invention was able to estimate field-scale yield with an RMSE of 971 kg/ha, and an average and median error of −740 kg/ha and −573 kg/ha respectively (for the best performing VI). The R2 between the yield estimates using this dataset and the reported yield ranged between 0.84 and 0.89 for all VIs tested, while overall the MTVI2-based fused LAI outperformed the other VIs for most of the performance metrics.

TABLE 1

| VI | NDVI | EVI2 | MTVI2 | MSAVI | WDRVI | GREEN WDRVI | GCVI | QSAVI | GSR | GNDVI | RDVI | TVI | SR |
|---|---|---|---|---|---|---|---|---|---|---|---|---|---|
| Original LAI | | | | | | | | | | | | | |
| Average error (kg/ha) | −845 | −856 | −740 | −807 | −847 | −833 | −827 | −851 | −826 | −835 | −774 | −819 | −835 |
| Median error (kg/ha) | −868 | −868 | −573 | −573 | −868 | −898 | −870 | −868 | −870 | −868 | −653 | −675 | −833 |
| RMSE (kg/ha) | 1049 | 1059 | 671 | 1031 | 1044 | 1006 | 993 | 1053 | 993 | 1017 | 1002 | 1025 | 1038 |
| $R^2$ | 0.85 | 0.85 | 0.85 | 0.84 | 0.86 | 0.88 | 0.89 | 0.85 | 0.83 | 0.87 | 0.84 | 0.86 | 0.86 |
| Adjusted LAI | | | | | | | | | | | | | |
| Average error (kg/ha) | −545 | −558 | −550 | −572 | −594 | −563 | −561 | −538 | −575 | −556 | −519 | −579 | −627 |
| Median error (kg/ha) | −378 | −378 | −511 | −488 | −488 | −525 | −380 | −378 | −488 | −525 | −438 | −488 | −554 |
| RMSE (kg/ha) | 817 | 850 | 817 | 834 | 887 | 845 | 854 | 809 | 866 | 832 | 767 | 829 | 913 |
| $R^2$ | 0.86 | 0.84 | 0.86 | 0.86 | 0.83 | 0.85 | 0.84 | 0.86 | 0.84 | 0.85 | 0.88 | 0.86 | 0.83 |

Using the adjusted LAI improved the accuracy of the field-scale yield prediction substantially with an RMSE of 757 kg/ha, and an average and median error of −519 kg/ha and −438 kg/ha respectively (for the best performing VI). The $R^2$ between the estimated and the reported yield ranged between 0.83 and 0.88 for all VIs tested, while overall the RDVI-based fused LAI outperformed the other VIs for most of the performance metrics.

Figure 9:
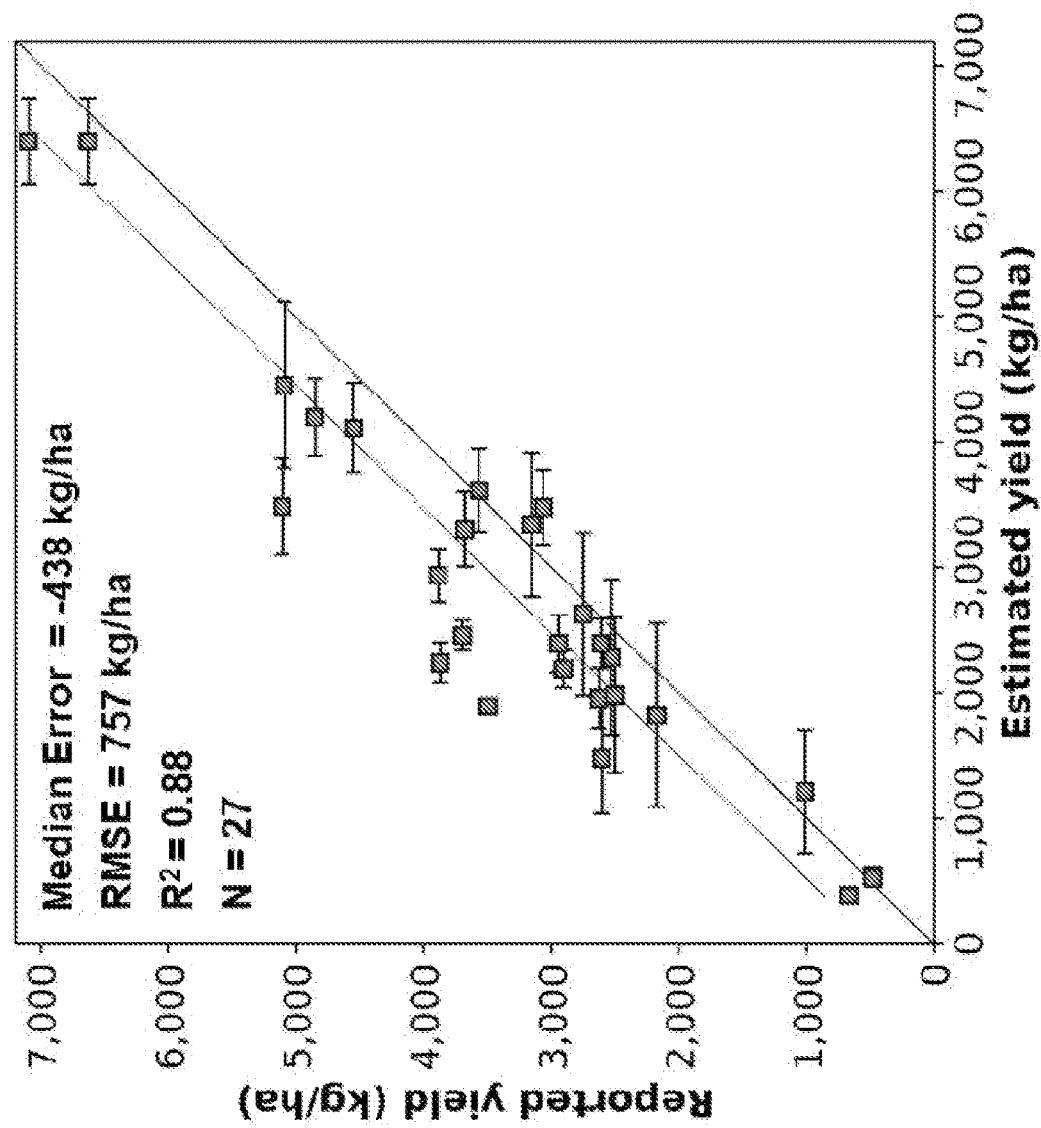
FIG. 9 shows a comparison between wheat yield reported by farmers and estimated yield at the field-scale, as estimated by the method of the present invention, when using the adjusted RS LAI based on the RDVI.

The method proposed by the present invention was not very sensitive to the VI used to generate the fused LAI, as shown in FIG. 2. However, overall the results highlight that using the fused-LAI equivalent to the original generic S2-LAI underperformed the field-scale yield predictions, resulting from using the adjusted LAI dataset. The adjusted RS LAI based on the RDVI (Renormalized Difference Vegetation Index—this index uses the difference between near-infrared which vegetation strongly reflects, and red light, which vegetation absorbs, to highlight healthy vegetation) resulted in the best yield prediction accuracy with $R^2=0.88$ and RMSE=757 kg/ha (average of −15%) between the reported and estimated yield, as shown in FIG. 9. In addition, the method proposed by the present invention was able to estimate both the lowest (under 1,050 kg/ha) and highest yields (above 6,500 kg/ha) with satisfying accuracy, with an RMSE of 178 kg/ha (average error of 1 kg/ha, −1%) and 522 kg/ha (average error of 468 kg/ha, −7%), respectively. Despite these results, the method proposed by the present invention tended to underestimate the reported yield in the tested conditions. FIG. 9 shows a comparison between wheat yield reported by farmers and estimated yield at the field-scale estimated by the method of the present invention, when using the adjusted RS LAI based on the RDVI. Each red square represents the 27 fields for which yield was reported by farmers; the whiskers represent the standard deviation of the estimated yield; the black line represents the 1:1 line and the blue line represent the trendline.

An additional goal of the present invention is to generate yield maps at the pixel level months before the harvest. Yield maps can help with estimating profitability, assessing the impacts of treatments used, establishing management zones, estimating the number of nutrients removed by the harvested crop, improving farmers' skills, reducing yield gaps and identifying areas which have predominantly large continuous gaps. The 3 m yield maps produced by the proposed method can help to address these challenges, especially in regions where reliable geolocated yield data obtained from harvesters is not available (such as in many developing countries).

The estimated yield at the sub-field scale was tested for 22 fields. Table 2 shows the results, which indicate that when using the fused-LAI which was equivalent to the original generic S2-LAI, the proposed yield prediction method was able to produce estimated yield maps with an RMSE of 1,108 kg/ha, and an average and median error of −467 kg/ha and −534 kg/ha respectively (for the best preforming VIs) at the pixel level (for all pixels of all maps). The R2

TABLE 2

| VI | NDVI | EVI2 | MTVI2 | MSAVI | WDRVI | GREEN WDRVI | GCVI | QSAVI | GSR | GNDVI | RDVI | TVI | SR |
|---|---|---|---|---|---|---|---|---|---|---|---|---|---|
| Original LAI | | | | | | | | | | | | | |
| Average error (kg/ha) | −604 | −625 | −572 | −652 | −665 | −644 | −606 | −605 | −605 | −660 | −467 | −660 | −652 |
| Median error (kg/ha) | −627 | −607 | −677 | −681 | −690 | −646 | −600 | −627 | −601 | −654 | −534 | −683 | −672 |
| RMSE (kg/ha) | 1108 | 1133 | 1215 | 1145 | 1184 | 1165 | 1148 | 1109 | 1147 | 1156 | 1199 | 1146 | 1183 |
| $R^2$ | 0.30 | 0.31 | 0.28 | 0.30 | 0.32 | 0.31 | 0.32 | 0.30 | 0.32 | 0.31 | 0.30 | 0.30 | 0.32 |
| Adjusted LAI | | | | | | | | | | | | | |
| Average error (kg/ha) | −894 | −911 | −687 | −839 | −886 | −845 | −813 | −895 | −812 | −872 | −668 | −852 | −856 |
| Median error (kg/ha) | −999 | −999 | −855 | −845 | −966 | −944 | −926 | −999 | −927 | −966 | −819 | −851 | −976 |
| RMSE (kg/ha) | 1288 | 1303 | 1281 | 1258 | 1285 | 1235 | 1214 | 1289 | 1213 | 1250 | 1299 | 1261 | 1272 |
| $R^2$ | 0.30 | 0.31 | 0.27 | 0.29 | 0.32 | 0.31 | 0.32 | 0.30 | 0.32 | 0.31 | 0.30 | 0.30 | 0.32 | between the yield estimates using this dataset and the reported yield ranged between 0.28 and 0.32 for all VIs tested, while overall the RDVI-based fused LAI slightly outperformed the other VIs.

Figure 10:
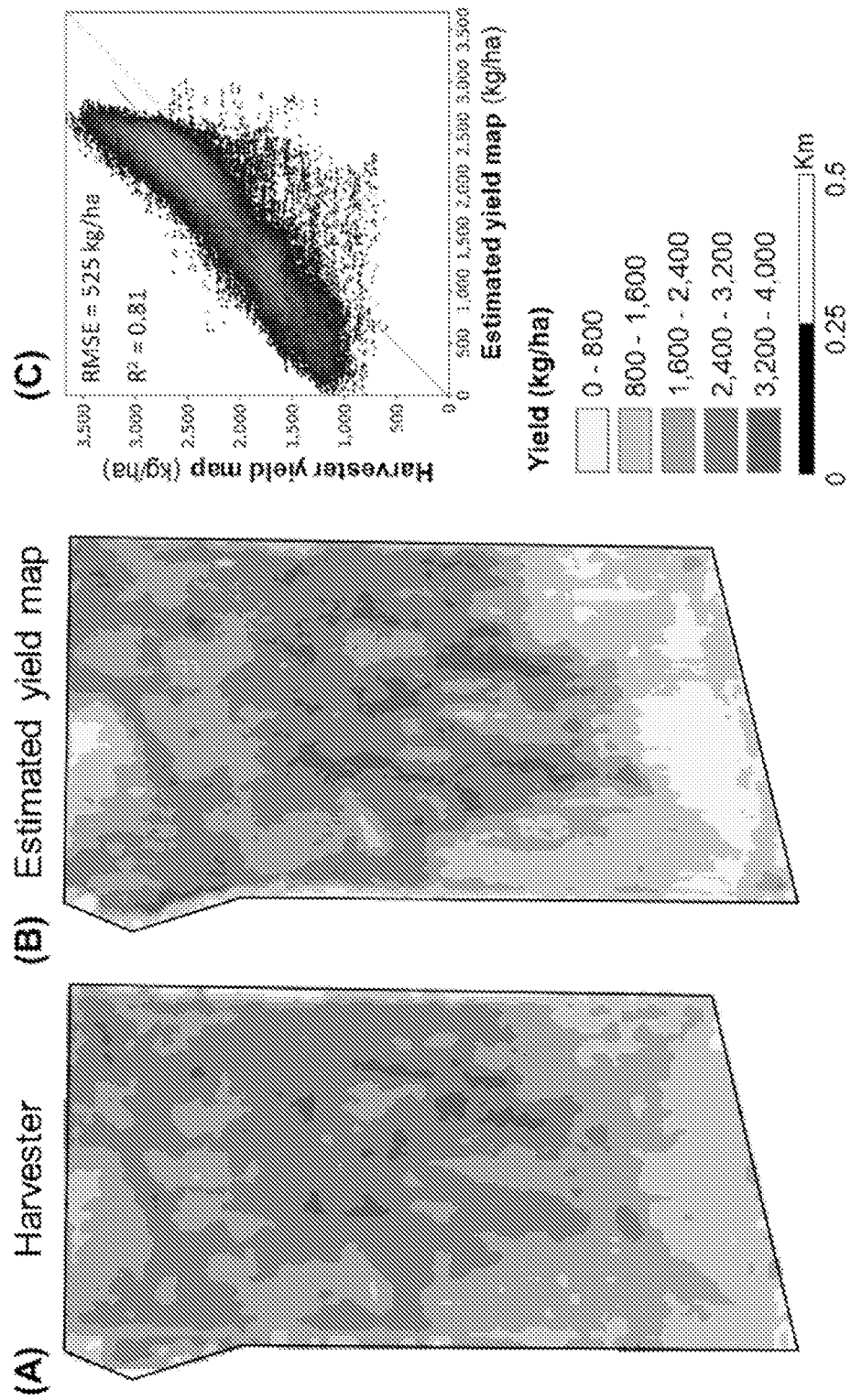
FIG. 10 is a yield map generated by the harvester (A) and yield map generated three months before harvest using the proposed methodology (B) and their comparison (C) for a wheat field.

In some cases, the correlation at the pixel level between the harvester and the estimated yield maps was higher than $R^2=0.81$ (RMSE>525 kg/ha), as shown in FIG. 10. FIG. 10 is a yield map generated by the harvester (A) and yield map generated three months before harvest using the proposed methodology (B) and their comparison (C) for a wheat field near Birchip, Victoria, Australia. In (B) the estimated 3 m pixel size yield map was generated on the 18Aug. 2018 which was three months before the harvest (17Nov. 2018). In (C) the correlation between the two yield maps is presented in the form of a scatterplot, where the black line represents the 1:1 line and the blue line represents the trend line. The correlation analysis between these maps found an RMSE=525 kg/ha and $R^2=0.81$.

These results are equivalent to the accuracy of other yield mapping methods reported in the literature. However, the yield maps generated by the proposed method provided a substantially higher spatial resolution with the same overall accuracy and produced without using any calibration.

As the proposed method uses the peak of the field's LAI (the day with the highest field-scale median LAI of the season) to generate the yield maps, The proposed method enables the creation of yield map estimation at 3 m pixel size several months (typically between 2 and 4 months) before the harvest, without any ground data for calibration or training. The produced yield maps enabled the estimation of pixel level yield on average of 3 months before the reported harvest.

The proposed method was able to estimate wheat yield two to three months before the harvest with satisfactory accuracy. The results suggest that using the wheat-adjusted LAI improves the accuracy of field-scale yield predictions substantially in comparison to using the fused-LAI, which is equivalent to the original generic S2-LAI. Implementing the proposed method using the adjusted LAI resulted in an RMSE of 757 kg/ha ($R^2=0.88$) across the 27 studied fields, while implementation with the original LAI achieved an RMSE of 971 kg/ha ($R^2=0.89$). The best performing VI fusion-based LAI for the original LAI was MTVI2 and for the adjusted LAI, RDVI was found to achieve the best accuracy with an RMSE of 757 kg/ha ($R^2=0.88$).

The accuracy of the yield maps generated by the proposed method resulted in $R^2=0.32$ (RMSE of 1,213 kg/ha) using the best performing VI (RDVI).

The method to detect sowing dates may be used to produce and update near-daily low-cost field level statistics with a large spatial coverage (with an RMSE of 1.9 days). The method was also proven effective for detecting harvested areas at the field and sub-field scales with very high accuracy (RMSE of 2.6 days). Moreover, it was shown that sowing dates detected using this method could be used as a model input to estimate yield.

The method proposed by the present invention leverages the power of high-resolution remote sensing and crop models to estimate and map crop yield at the field ($R^2=0.88$, RMSE of 757 kg/ha) and sub-field ($R^2=0.32$, RMSE of 1,213 kg/ha) scales.

Whether conditions such as clouds and clouds shading may deteriorate the data originated from optical remote sensing. In order to overcome this problem, the methods proposed by the present invention is adapted to make data fusion of Synthetic Aperture Radar (SAR—radar that is used to create two-dimensional images or three-dimensional reconstructions of objects, such as landscapes) with optical imagery (for example Sentinal-2 or PlanetScope). This makes the method more robust by providing a cloud-free dataset, which enables better estimation and monitoring of crops LAI.

According to another embodiment, the proposed method may be also implemented to estimate the yield from the pixel level also to any region of interest, as well (which may include not only fields but also urban areas).

Figure 11:
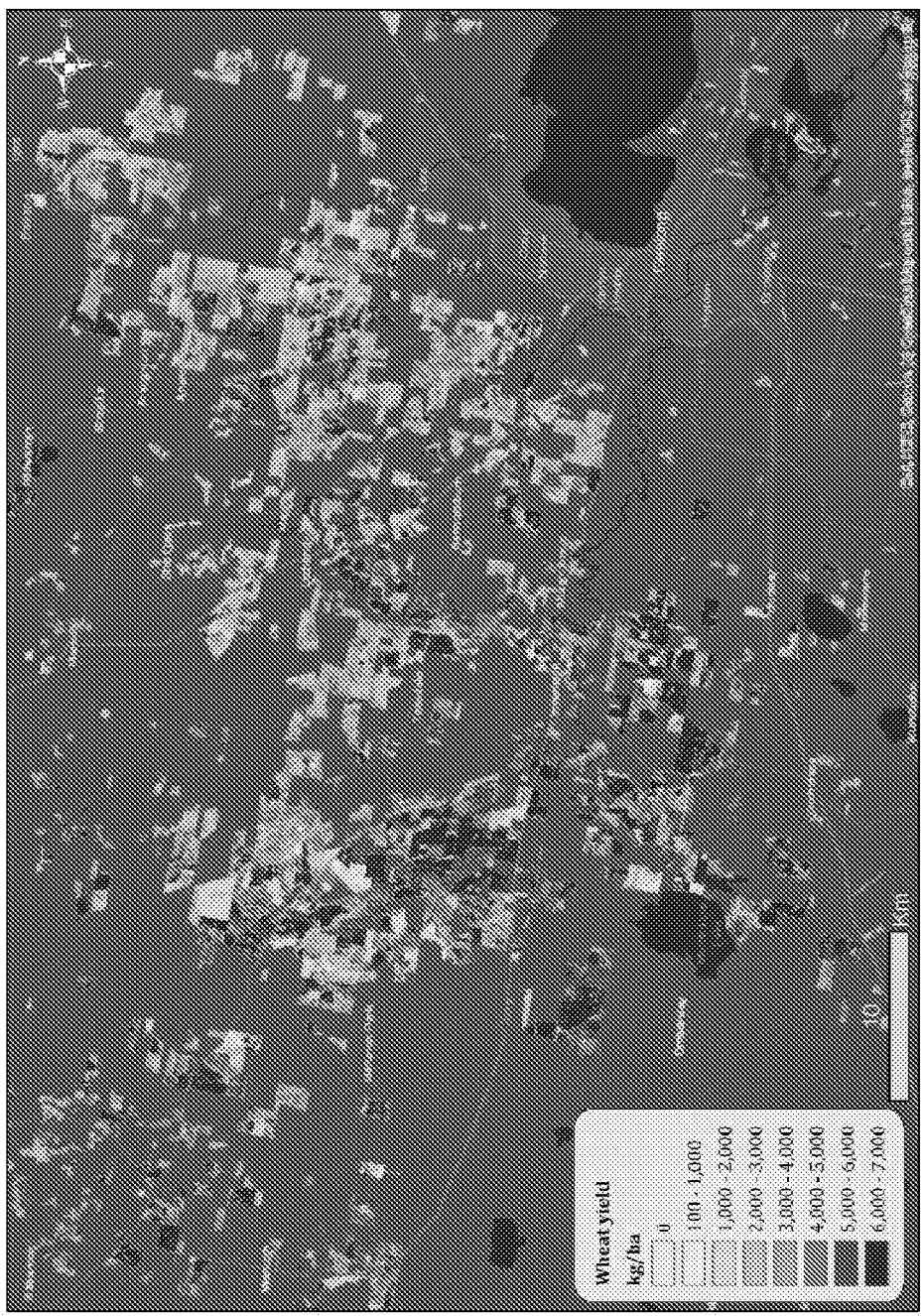
FIG. 11 shows a yield map of a region of interest of Geelong county (Australia).

FIG. 11 shows a yield map of a region of interest of Geelong county (located in the state of Victoria, Australia). The official reported yield for Geelong county in 2020 was 3,900 kg/ha. The estimated yield of the method of the present invention for the same region was 4,012 kg/ha about 2.5 months before harvest. The accuracy was therefore 97.65%.

According to another embodiment, the proposed method may be also implemented to estimate the additional outputs from the crop simulator, such as mapping the carbon level in the soil of an area of interest. For example, in case of using APSIM, the model outputs additional parameters which can be accurately estimated by the method provided by the present invention, such as biomass (is the plant material used as fuel to produce electricity or heat), plant carbon level, plant phenology, crop nitrogen level, grain protein level, grain size and number, soil water, soil nutrients, plant available water (the difference between field capacity, i.e., the maximum amount of water the soil can hold and the wilting point, where the plant can no longer extract water from the soil) and more.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:
1. A method for estimating, a crop yield at the end of a growing season for individual fields in an analyzed area that comprises a large number of individual fields all growing the same crop, the method comprising:
  a) acquiring imagery data from one or more remotely sensed sources during said growing season;
  b) generating a remotely sensed Leaf Area Index (LAI) of said analyzed area by fusing the acquired imagery data;
  c) processing said imagery data to detect a sowing date of said analyzed area;
  d) feeding the detected sowing date, or a sowing date window, into a crop simulator;
  e) generating a set of predetermined parameters representing a state of said analyzed area and feeding said set of predetermined parameters into said crop simulator;
  f) generating, by said crop simulator, a plurality of LAI simulations and a corresponding yield prediction, each of which corresponds to a different combination of said predetermined parameters;
  g) identifying and selecting only LAI simulations in which the simulated LAI best matches the remotely sensed LAI during said growing season, while omitting all other LAI simulations; and
  h) selecting the yield prediction for the end of said growing season that corresponds to simulation(s) having the best match;

wherein, step g) is carried out according to the following steps:
(i) estimate the LAI for the analyzed area using remote sensing data, which is collected multiple times throughout the growing season to generate an LAI time-series for the analyzed area;
(ii) simulate crop development using a crop simulation model, which generates both LAI and yield predictions and from each simulation, extract only the LAI values that fall within a duration of the highest remotely sensed LAI values found in step (i);
(iii) calculating for each simulation of step (ii) the following variables:
(iii.1) a gap in LAI between a maximal simulated LAI extracted in step (ii) and a maximal remotely sensed LAI found in step (i);
(iii.2) calculating a gap in days between a timing of the maximal simulated LAI extracted in step (ii) and remotely sensed LAI found in step (i);
(iii.3) calculating a RMSE between simulated LAI extracted in step (ii) and remotely sensed green LAI found in step (i), wherein, green LAI represent the stages when the leaves are photosynthetically active;
(iii.4) calculating a RMSE between simulated extracted in step (ii) and remotely sensed senescence LAI found in step (I), wherein senescence LAI represent the stages when the leaves are not photosynthetically active, in the range between the maximum remotely sensed LAI and 1;
(iv) selecting only the simulations from step (iii1) with lowest percentage gaps in LAI between the maximum simulated LAI and remotely sensed LAI;
(v) selecting from the simulations selected in step (d) only the simulations with a gap in days calculated in step (iii2) between the timing of the maximal simulated LAI and remotely sensed LAI that is within a range of +/− a predetermined number of days;
(vi) increasing the range in step (v), if none of the LAI simulations selected in step (v) complies within the range of +/− the predetermined number of days, until obtaining compliance;
(vii) selecting only the simulations that will be within the highest percentage of the average simulated senescence LAI of the selected simulations in steps (v) or (vi); and
(viii) setting an estimated yield of the analyzed area to be the average of the simulations in step (vii) with lowest RMSE in the range of 10-60% between simulated and remotely sensed Green LAI calculated in step (iii3);
wherein:
A) the method does not require any ground based data for calibration;
B) the estimation of the final yield can be made before the end of the growing season;
C) yield estimation is performed from the pixel level to any individual field in the analyzed area by the following method:
C.1) calculating a conversion factor CF using the equation:

$$\text{Conversion Factor} = \frac{\text{Estimated Yield}}{\text{Remotely Sensed LAI}_{max}}$$

wherein Estimated Yield is the estimated field-scale yield from step h, and Remotely Sensed $LAI_{max}$ corresponds to the season's maximum field-scale median LAI value from the remotely sensed LAI map from step b, for the day when RS LAI was detected as being the maximum, within that field, during the growing season;
C.2) multiply each pixel of the LAI map (of the remotely sensed $LAI_{max}$) by the CF, thereby converting the LAI values into yield (kg/ha) at the pixel level for the individual field.

2. The method according to claim 1, wherein imagery data is collected from a remote sensing platform.

3. The method according to claim 1, wherein the crop simulator is selected from the group of:
APSIM;
SAFY;
DSSAT;
WOFOST; and
AquaCrop.

4. The method according to claim 1, wherein the parameters are selected from the group of:
weather data retrieved from nearest weather station;
soil data based on the nearest soils;
initial water content;
fertilization data at sowing;
fertilization data during the season;
types of cultivars; and
plant population.

5. The method according to claim 1, wherein data extracted from images is used to create daily LAI datasets at a predetermined resolution.

6. The method according to claim 1, further comprising detecting the harvest date of the analyzed area, similarly to the detection of the sowing date, at the end of the season.

7. The method according to claim 1, wherein the predetermined threshold ranges between 1-100%.

8. The method according to claim 1, wherein whenever a maximum remotely sensed LAI is lower than 0.9, setting an estimated yield to be an average of LAI simulations having the lowest yield estimation.

9. The method according to claim 1, wherein whenever step g) results with less than 10 simulations, set the estimated yield to be the average of all these simulations, without executing step h).

10. The method according to claim 2, wherein the remote sensing platform is one or more satellites.

11. The method according to claim 1, wherein estimation of the crop yield is performed by one of:
a) using a sowing window with no inputs regarding detected sowing dates as inputs; and
b) coupling the remotely sensed sowing dates and Leaf Area Index (LAI) datasets with the crop simulator.

12. The method according to claim 1, comprising the step of data fusion of SAR imagery with optical imagery.

13. The method according to claim 1, wherein estimations are performed according for one or more of the following simulator outputs:
biomass;
plant carbon level;
plant phenology;
crop nitrogen level;
grain protein level;
grain size and number;
soil water;
soil nutrients;
soil carbon level;
plant available water.

* * * * *